United States Patent Office 3,778,289
Patented Dec. 11, 1973

3,778,289
RENDERING INORGANIC PIGMENTS DISPERSIBLE BY INCORPORATION OF HYDROXY-SUBSTITUTED 1,3-DIOXA-2-SILA-CYCLOHEXANES
August Böckmann, Krefeld-Bockum, Gerhard Trenczek, Krefeld-Uerdingen, Hans Rudolf, Krefeld-Bockum, Wolfgang Wiegreffe, Krefeld, and Wolfgang Ritter, Dusseldorf, Germany, assignors to Bayer Aktiengesellschaft, Leverkusen, Germany
No Drawing. Filed Mar. 14, 1972, Ser. No. 234,665
Claims priority, application Germany, Mar. 19, 1971, P 21 13 297.8
Int. Cl. C08j 1/36
U.S. Cl. 106—308 Q
10 Claims

ABSTRACT OF THE DISCLOSURE

Inorganic pigments such as titanium dioxide are rendered easily dispersible in aqueous or non-aqueous systems by the presence of about 0.1 to 5% by weight of hydroxy-substituted 1,3-dioxa - 2 - sila-cyclohexanes, preferably of the formula

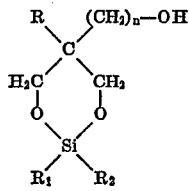

wherein
R is hydrogen, alkyl, alkoxyalkyl or aryl,
$R_1$ and $R_2$ each independently is alkyl, and
$n$ is 0 or 1,
the alkyl radicals of R, $R_1$ and $R_2$ each containing up to about 6 carbon atoms.

---

The present invention is concerned with easily dispersible inorganic pigments and with a process for their production and use.

It is known that inorganic pigments can be treated with organic substances in order to improve their dispersibility in, for example, plastics such as PVC, polycarbonates, polystyrene or polyethylene, or in synthetic resinous binding agents for varnishes, plasticizers etc.

For this purpose, agents containing silicon are especially effective. As a rule, however, silicon-containing agents confer good solubility only in non-aqueous binding-agent systems.

The following after-treatment agents containing silicon are among those that have been recommended: silicone oils (DAS 1,212,047), polysiloxanes (DAS 1,063,-733), octamethylcyclotetrasiloxanes (U.S. Pat. 2,938,009, British Pat. 959,211) or other organopolysiloxanes such as hexamethyldisiloxane, decamethyltetrasiloxanes or octamethyltrisiloxanes (British Pat. 887,257); as well as hydrolyzable compounds such as organohalosilanes and organoalkoxysilanes, where the alkoxy group must not contain more than 4 C-atoms (DAS 1,172,245); British Pats. 1,154,835; 785,393; 594, 730).

The pigments after-treated with these Si compounds are strongly hydrophobic and therefore, cannot be used for many purposes. They cannot, for example, be satisfactorily employed in systems containing water such as dispersed dyes. During their incorporation into organic systems, troublesome clouds of dust are produced that make the process most difficult. The organohalosilanes have the additional disadvantage that they give off HCl on hydrolysis and that this is difficult to separate from the pigment and attacks the after-treatment plant. The alkoxy-containing silanes mentioned are too volatile to be used with pigments ground in the ordinary present-day jet mills.

It is accordingly an object of the present invention to produce inorganic pigments possessing the easy dispersibility of pigments treated with silicone oils, without the disadvantages mentioned, so that the pigments have the particular advantage of universal application, permitting them to be employed in either aqueous or organic binders.

The object of the present invention, i.e. easily dispersible inorganic pigments, is realized by treating the pigments with silicon-containing compounds, wherein the silicon-containing susbtances are 1,3 - dioxa-2-sila-cyclohexanes containing hydroxyl groups.

The 1,3-dioxa-2-sila-cyclohexanes containing hydroxyl groups are preferably of the general formula

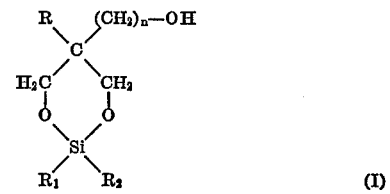 (I)

wherein

R is hydrogen, alkyl, alkoxyalkyl or aryl,
$R_1$ and $R_2$ each independently is alkyl, and
$n$ is 0 or 1,
the alkyl radicals of R, $R_1$ and $R_2$ each containing up to about 6 carbon atoms.

Preferably, R is hydrogen, phenyl or an alkyl radical such as cycloalkyl or lower alkyl, e.g. cyclohexyl, methyl, ethyl, n-propyl-, iso-propyl, n-butyl, iso-butyl, and the like, although it may be an alkoxyalkyl radical such as methoxymethyl. The preferred alkyl radicals for $R_1$ and $R_2$ are the same as those for R.

The compounds of Formula I wherein $n$ is 1 have not hitherto been described in the literature and are the subject of application Ser. No. 234,332, filed Mar. 13, 1972, now pending. They are obtained by the reaction of tris-(hydroxymethyl)-alkanes with dialkyldihydroxysilanes, with dialkoxydialkylsilanes or with cyclic alkylsilazanes. The reaction occurs at temperatures between about 25 and 200° and can be carried out either in the presence or absence of a solvent or diluent such as benzene, toluene, petroleum ether or xylene.

In the case of reactions in which a hydrogen halide is split off, a hydrogen halide acceptor such as triethylamine may also be present.

The reaction of glycerine with hexamethylcyclotrisilazanes, dimethyldialkoxysilanes such as dimethyldiethoxysilane, dimethyldimethoxysilane, dimethyldibutoxysilane and others in accordance with U.S. patent specification 2,811,542 is also known. This reaction, as our own experiments have shown, can also be extended to other polyols such as tri- and tetra-ols.

Examples of substances that can be employed in accordance with the invention are:

2,2,5-trimethyl-5-hydroxymethyl-(1,3-dioxa-2-sila-cyclohexane),
2,2-dimethyl-5-ethyl-5-hydroxymethyl-(1,3-dioxa-2-sila-cyclohexane),
2,2-dimethyl-5-butyl-5-hydroxymethyl-(1,3-dioxa-2-sila-cyclohexane),
2,5-dimethyl-2-ethyl-5-hydroxymethyl-(1,3-dioxa-2-sila-cyclohexane),
2,2,5-triethyl-5-hydroxymethyl-(1,3-dioxa-2-sila-cyclohexane),
2,2-dimethyl-5-hydroxy-(1,3-dioxa-2-sila-cyclohexane), Examples of the tri- and tetra-ols that can be used as starting materials are:

1,1,1-trimethylolethane; 1,1,1-trimethylolpropane, 1,1,1-trimethylolbutane, glycerine or pentaerythritol.

Examples of the dialkyldichlorosilanes are: dimethyldichlorosilane, diethyldichlorosilane or ethylmethyldichlorosilane.

The following are particularly effective for use in accordance with the present invention:

2,2,5-trimethyl-5-hydroxymethyl-(1,3-dioxa-2-sila-cyclohexane),
2,2-dimethyl-5-ethyl-5-hydroxymethyl-(1,3-dioxa-2-sila-cyclohexane), and
2,2-dimethyl-5-hydroxy-(1,3-dioxa-2-sila-cyclohexane).

The compounds for use in accordance with the invention are added in amounts of about 5% to 0.1% by weight, preferably about 2 to 0.2% by weight calculated on the dry pigment, where either pure substances or mixtures thereof may be used.

The measuring-out of the substrate for use in accordance with the invention in the pigment presents no difficulties because the substances are liquid at room temperatures.

The addition may also be carried out in the presence of a solvent or emulsifier.

The point in the production process of the pigment at which the agent affecting the dispersibility is added to the pigment is of no great importance.

The treatment can be carried out by adding the organic substance undiluted, dissolved or emulsified to the untreated or inorganically after-treated pigment, before or during the final grinding, for example in a toothed, ball, oscillatory or jet mill.

A further possibility in the treatment of, for example, titanium dioxide, consists in mixing the substances of the invention with the pigment at the filter-cake stage after coating with inorganic substances such as $TiO_2$-, $SiO_2$- and $Al_2O_3$-Aquat in a kneading process, after which the pigment is dried and ground. The term "Aquat" is used for $TiO_2$-, $SiO_2$- and $Al_2O_3$, containing either chemically or physically bonded water, e.g. $Al(OH)_3$ or $Al_2O_3 \cdot H_2O$.

The process may be applied to all inorganic white or colored pigments. Particularly favorable results are obtained with titanium dioxide, iron oxide and chromium oxide pigments. The titanium dioxide pigment may have been produced by vapor-phase oxidation of $TiCl_4$ or by hydrolysis of titanyl sulfate or titanium tetrachloride solutions followed by calcination.

Tests of the dispersion behavior of $TiO_2$ pigments in plastics and synthetic resin coating binders were carried out by so-called dissolver tests and strewing tests.

STREWING TEST

A black PVC sheet was produced on a mixing roller. The titanium dioxide pigment was then strewn on to this black sheet during the course of ½ a minute. Pigment remaining on the rollers was scraped off with a spatula and likewise worked into the sheet. During the whole time, the sheet was continually turned by hand. After 1, 2, 4, 8 and 16 minutes respectively, reckoned from the end of the strewing operation, samples were removed from the sheet on the roller during the mixing.

The dispersibility of the pigments can be judged by the non-dispersed agglomerations of pigments in the form of spots and streaks. Values from 1 to 5 were assigned to the samples: 1=very good; 2=good; 3=satisfactory; 4=fair; 5=poor. With some practice, the test gives highly reproducible results.

COMPOSITION OF THE BLACK SHEET

| | Parts by weight |
|---|---|
| PVC emulsion (K-value 70) | 50 |
| Dioctylphthalate | 22.50 |
| Diphenylthiourea | 0.25 |
| Carbon black 100 S (supplier: Degussa) | 0.15 |

OPERATING CONDITIONS

Temperature 165° C., 15 revolutions per minute for the front roller and 12 r.p.m. for the back roller. The thickness of the sheet was 180–200μ.

DISSOLVER TEST 10 g. of the pigment under test were added to a black PVC paste and dispersed with a laboratory stirrer fitted with a dissolver disk at 2500 r.p.m. for 5 minutes. Samples were taken after 1, 3 and 5 minutes. These samples were applied to white cardboard by means of a 240 μm coater and then gelled for 15 minutes at 120° C. It is easy to judge the dispersibility by means of the clearly visible spots of pigment as well as from the differing shades of grey of the samples. Numerical values from 1 to 5 were assigned to the samples: 1=very good; 2=good; 3=satisfactory; 4=fair; 5=poor.

PREPARATION OF THE BLACK PVC PASTE 100 parts PVC emulsion (K-value 70)
42 parts dioctylphthalate
0.5 part diphenylthiourea
0.2 part carbon black 100 S from Degussa were twice ground in a three-roller mill, and 25 parts of plasticizer were added and stirred under with the aid of a glass rod.

WETTABILITY IN $H_2O$

A 100-m. glass beaker was ¾ filled with distilled water and 2 g. of the pigment under test were placed on the surface of the water with a spatula. Pigments easily wettable by water immediately sink to the bottom (evaluation mark 1). Pigments that are more difficult to wet sink only after some minutes after light tapping on the glass wall (mark 2). Non-wettable pigments remain on the surface of the water even after stirring with a glass rod. (mark 3.)

The following examples illustrate the process of the invention:

EXAMPLE 1

Preparation of 2,2-dimethyl-5-ethyl-5-hydroxymethyl-(1,3-dioxa-2-sila-cyclohexane) (I): 2010 g. of 1,1,1-trimethylolpropane and 1000 ml. of benzene were heated to 70° C. and well stirred. At this temperature, 1935 g. of dimethyldichlorosilane were slowly added dropwise while HCl was given off. After the dimethyldichlorosilane had been added, the mixture was heated under reflux until no more HCl was evolved. Thereupon, the reaction mixture was freed of benzene and distilled. Yield: 2440 g. (I) B.P.$_{0.65}$ 89° $n_D^{20}$ 1.4604. Analysis: $C_8H_{18}O_3Si$ (190). Calculated C, 50.5%, H, 9.47%. Found C, 50.3, H, 9.65%.

EXAMPLE 2

In a similar way, starting from 1,1,1-trimethylolethane, 2,2,5 - trimethyl - 5 - hydroxymethyl-(1,3-dioxa-2-sila-cyclohexane), B.P.$_{0.6}$ 70° $n_D^{20}$ 1.4512, was prepared.

EXAMPLE 3

(a) A $TiO_2$ furnace clinker with a rutile structure which had been made by the sulfate process was ground and sieved and subjected to an inorganic after-treatment consisting in precipitating from $TiO_2$- and $Al_2O_3$-Aquat.

This after-treatment was carried out in an aqueous suspension with about 20% by weight of $TiO_2$ at 60° C. while stirring vigorously. The mud was then filtered with a centrifugal filter and washed. The centrifugal-filter charge was again washed with water and passed to a second centrifugal filter. The washed filter charge (II) was dried at 140–170° C. and contained about 97% $TiO_2$.

(b) This pigment was sprayed with 0.5% (calculated on TiO₂) of 2,2-dimethyl-5-ethyl-5-hydroxymethyl-(1,3-dioxa-2-sila-cyclohexane), prepared as in Example 1, and reduced to micron size in a jet mill with superheated steam.

EXAMPLE 4

The same rutile pigment as in Example 3a was sprayed, following after-treatment and drying, with the 2,2,5-trimethyl - 5 - hydroxymethyl - (1,3 - dioxa-2-sila-cyclohexane) prepared as in Example 2 (0.5% substance, calculated on TiO₂) and then, under the same conditions as the pigment of Example 1 ground by a jet of steam.

EXAMPLE 5

The same rutile pigment as in Example 3a, following after-treatment and drying, was sprayed with 2,2-dimethyl - 5 - hydroxy - (1,3-dioxa-2-sila-cyclohexane) prepared as in U.S. Patent No. 2,811,542 (0.5%, calculated on TiO₂) and then ground with a steam jet as in Example 3a.

EXAMPLE 6

A titanium dioxide pigment having a rutile structure as in Example 3a was sprayed, following after-treatment with TiO₂ and Al₂O₃ Aquats and drying, with an aqueous dimethylpolysiloxane emulsion (0.5% dimethylpolysiloxane, calculated on TiO₂) and ground in a steam-jet mill.

Pigments treated as in Example 3–6 were tested by the methods described for dispersibility and wettability. The results are given in the following table.

| Pigment of Ex. | Organic substance, amount calculated on TiO₂ | Dispersibility in PVC dissolver test | Strewing test | Wettability in water |
|---|---|---|---|---|
| 3b | 0.5% 2,2-dimethyl-5-ethyl hydroxymethyl-(1,3-dioxa-2-sila-c cyclohexane). | 1 | 1 | ¹1 |
| 4 | 0.5% 2,2,5-trimethyl-5-hydroxymethyl-(1,3-dioxa-2-sila-cyclohexane). | 1 | 1 | ¹1 |
| 5 | 0.5% 2,2-dimethyl-5-hydroxy-(1,3-dioxa-2-sila-cyclohexane). | 1 | 1 | ¹1 |
| 6 | 0.5% dimethylpolysiloxane (as emulsion in H₂O). | 1 | 1 | ²3 |
| 3a | None | 5 | 5 | ¹1 |

¹ Easily wettable.  ² Non-wettable.

While the invention has been described with particular reference to titanium dioxide as the inorganic pigment, other inorganic pigments can be rendered dispersible in the same fashion, e.g. iron oxide, chromium oxide.

It will be appreciated that the instant specification and examples are set forth by way of illustration and not limitation, and that various modifications and changes may be made without departing from the spirit and scope of the present invention.

What is claimed is:

1. An easily dispersible inorganic pigment composition comprising an inorganic pigment and about 0.1 to 5% by weight of the pigment of a hydroxy-substituted 1,3-dioxa-2-sila-cyclohexane.

2. A composition according to claim 1, wherein said cyclohexane is a 2,2-dialkyl-5-hydroxymethyl or a 2,2-dialkyl-5-hydroxy-(1,3-dioxa-2-sila-cyclohexane).

3. A composition according to claim 1, wherein said cyclohexane is present to the extent of about 0.2 to 2% by weight and has the formula

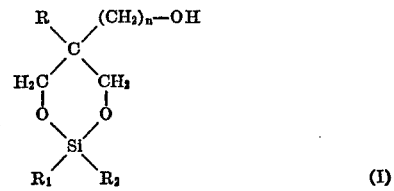

(I)

wherein

R is hydrogen, alkyl, alkoxyalkyl or aryl,
R₁ and R₂ each independently is alkyl, and
n is 0 or 1, the alkyl radicals of R, R₁ and R₂ each containing up to about 6 carbon atoms.

4. A composition according to claim 3, wherein

R is hydrogen, phenyl, cyclohexyl or lower alkyl, and
R₁ and R₂ each independently is lower alkyl.

5. A composition according to claim 4, wherein n is 0.

6. A composition according to claim 4, wherein n is 1.

7. A composition according to claim 1, wherein said inorganic pigment comprises titanium dioxide.

8. A composition according to claim 1, wherein said cyclohexane comprises 2,2,5-trimethyl-5-hydroxymethyl-(1,3-dioxa-2-sila-cyclohexane).

9. A composition according to claim 1, wherein said cyclohexane comprises 2,2-dimethyl-5-ethyl-5-hydroxymethyl-(1,3-dioxa-2-sila-cyclohexane).

10. In the process for preparing an aqueous or non-aqueous dispersion of an inorganic pigment wherein the dry pigment is stirred into a liquid into which it is to be dispersed, the improvement which comprises pretreating said pigment with a hydroxy-substituted 1,3-dioxa-2-sila-cyclohexane to incorporate said cyclohexane in said pigment to the extent of about 0.1 to 5% by weight.

References Cited
UNITED STATES PATENTS
3,649,588   3/1972   Kennedy-Skipton __ 106—308 Q CURTIS R. DAVIS, Primary Examiner U.S. Cl. X.R.
106—300